(12) United States Patent
Farrugia et al.

(10) Patent No.: US 9,274,976 B2
(45) Date of Patent: Mar. 1, 2016

(54) CODE TAMPERING PROTECTION FOR INSECURE ENVIRONMENTS

(75) Inventors: Augustin J. Farrugia, Cupertino, CA (US); Mathieu Ciet, Paris (FR); Pierre Betouin, Boulonge (FR)

(73) Assignee: APPLE INC., Cupertino, CA (US)

( * ) Notice: Subject to any disclaimer, the term of this patent is extended or adjusted under 35 U.S.C. 154(b) by 1464 days.

(21) Appl. No.: 12/940,971

(22) Filed: Nov. 5, 2010

(65) Prior Publication Data

US 2014/0101458 A1    Apr. 10, 2014

(51) Int. Cl.
| | |
|---|---|
| G06F 12/14 | (2006.01) |
| G06F 21/12 | (2013.01) |
| G06F 21/14 | (2013.01) |
| G06F 21/64 | (2013.01) |
| H04L 9/00 | (2006.01) |
| H04L 9/32 | (2006.01) |

(52) U.S. Cl.
CPC .......... *G06F 12/1408* (2013.01); *G06F 21/125* (2013.01); *G06F 21/14* (2013.01); *G06F 21/64* (2013.01); *H04L 9/002* (2013.01); *H04L 9/3239* (2013.01); *H04L 2209/043* (2013.01); *H04L 2209/16* (2013.01)

(58) Field of Classification Search
CPC ......... H04L 9/002; H04L 9/06; H04L 9/0618; H04L 9/0643
USPC .................................................. 713/189, 190
See application file for complete search history.

(56) References Cited

U.S. PATENT DOCUMENTS

| | | | | |
|---|---|---|---|---|
| 5,870,470 | A | * | 2/1999 | Johnson et al. ............... 380/285 |
| 7,599,492 | B1 | * | 10/2009 | Malyshev et al. ............... 380/37 |
| 7,783,046 | B1 | * | 8/2010 | Sklyarov et al. ............... 380/286 |
| 2005/0183072 | A1 | * | 8/2005 | Horning et al. ............... 717/140 |
| 2008/0168564 | A1 | | 7/2008 | Lerouge et al. |
| 2009/0158051 | A1 | * | 6/2009 | Michiels et al. ............... 713/189 |
| 2012/0045050 | A1 | * | 2/2012 | Farrugia et al. ................. 380/28 |

FOREIGN PATENT DOCUMENTS

| WO | WO 2010102960 A1 | * | 9/2010 |
|---|---|---|---|
| WO | WO 2010131563 A1 | * | 11/2010 |

OTHER PUBLICATIONS

S. Chow et al. "White Box Cryptography and an AES Implementation" Aug. 16, 2002. Revision to appear in the post-proceedings of the 9th Annual Workshop on Selected Areas in Cryptography (SAC'02) (18 pages) http://www.cs.colorado.edu/~jrblack/class/csci7000/s05/project/oorschot-whitebox.pdf.*

(Continued)

*Primary Examiner* — Joseph P Hirl
*Assistant Examiner* — Thomas Gyorfi
(74) *Attorney, Agent, or Firm* — Adeli LLP

(57) ABSTRACT

In the field of computer software (code) security, it is known to include verification data such as hash values in or associated with the code to allow subsequent detection of tampering by a attacker with the code. This verification technique is used here in a "White Box" cryptographic process by tying the verification data to the content of functional table lookups present in the object (compiled) code, where values in the table lookups are selectively masked (prior to the source code being compiled into the subject code) by being subject to permutation operations.

31 Claims, 5 Drawing Sheets

(56) References Cited

OTHER PUBLICATIONS

S. Chow et al. "A White Box DES Implementation for DRM Applications" Version: Oct. 15, 2002; Pre-proceedings for ACM DRM-2002 workshop (16 pages).*

Porus Homi Havewala. "Mask Your Secrets Using Oracle Enterprise Manager" Published Aug. 2010 (16 pages) http://www.oracle.com/technetwork/articles/havewala-datamasking-grid-166436.html.*

Billet, O. et al. (2005). "Cryptanalysis of a White Box AES Implementation," Handschuh, H, et al. eds., *SAC* 2004 3357:227-240.

* cited by examiner

CODE TAMPERING PROTECTION FOR INSECURE ENVIRONMENTS

FIELD OF THE INVENTION

This invention relates to data security and cryptography and more generally to improving the security of computer enabled cryptographic processes.

BACKGROUND

Cryptographic algorithms are widely used for encryption and decryption of messages, authentication, digital signatures and identification. The AES (Advanced Encryption Standard) is a well known cipher. AES is an exemplary symmetric block cipher. Block ciphers operate on blocks of plaintext and ciphertext, usually of 64 or 128 bits but sometimes longer. Stream ciphers are the other main type of cipher and operate on streams of plain text and cipher text 1 bit or byte (sometimes one word) at a time. With a block cipher, a particular plain text block will always be encrypted to the same cipher text block using the same key. However, to the contrary with a stream cipher, the same plain text bit or byte will be encrypted to a different bit or byte each time it is encrypted. Hence in the ECB (electronic code book) mode for block ciphers, each plain text block is encrypted independently. In another mode, encryption is also a function of the previous blocks.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box or s-box. This operation provides non-linearity in the cipher and significantly enhances security.

Note that these block ciphers are symmetric ciphers, meaning the same algorithm and key are used for encryption and decryption, except usually for minor differences in the key schedule. As is typical in most modern ciphers, security rests with the (secret) key rather than the algorithm. The s-boxes or substitution boxes accept an n bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decoding by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation using a data structure (the table) to replace a computation with an array indexing operation.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key.

An extension of Chow et al. was published by Olivier Billet et al. "Cryptanalysis of a White Box AES Implementation" in SAC 2004, LNCS 3357 pp. 227-240, 2005. The details of the processed basic operations are necessary to mount this attack. This means the attacker has to distinguish the set of operations to extract the operations per rounds, the MixColumn operation, etc.

Hence there are two basic principles in the implementation of secure computer applications (software). The first is called "Black Box" because it implicitly supposes that the user does not have access to the computer code nor any cryptographic keys themselves. The computer code security is based on the tampering resistance over which the application is running, as this is typically the case with SmartCards. For the "White Box", it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in DRM (Digital Rights Management) applications to protect e.g. audio and video content.

Software implementation of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

Since all the possible inputs have to be considered, the inputs are split into sets of bytes. The result after each operation on each byte is stored. Moreover, for security reasons, the input and output of the tables are masked through various methods (including permutations). The size of the tables differs according to the choice of the input decomposition (byte, half byte, double-bytes . . . ) and to the choice of the masking process (a XOR, random permutation etc.) See Chow et al.

When a block cipher has been implemented using a White Box approach, the code of the execution process is not particularly long and mainly consists of the lookup table accesses and masks managements, plus some extras. The first goal for an attacker reverse engineering such code is to retrieve the code to obtain, after simplification, an equivalent understandable and executable source code. Various tools exist to harden the code against reverse engineering threats. But, this is often not enough security.

SUMMARY

The present method and apparatus tie the (e.g. White Box) table lookups to the associated implementing computer code to obtain a monolithic code (meaning hard for an attacker to penetrate) at source code compilation time to avoid an attacker replacing any lifted code with other code. In other words, tying the tables to the code provides an opportunity for code integrity verification. This means that an attacker will have to break several different layers of protection before having a fully functional reverse engineered code. The method is not limited to decryption or block ciphers, but is useful for any cryptographic process having lookup tables.

Consider an existing White Box implementation of a cryptographic algorithm. The associated computer code mainly corresponds to a set of table accesses and their management. In the implementation of secure code, various basic operations have been masked, modified, changed into more complex forms, etc. One of the possible ways for an attacker to proceed is to isolate some small functions, to understand what they are doing, to try to find where they are repeated (loops) and then, recompose the original code considering this information. As already explained, the table lookups are generated through a specific process managing correctly the masks on input and output data. See FIG. 1 showing graphically a conventional such table 10 having indexed entries a, b, c, etc.

If an attacker is able to reverse-engineer the code of an encryption algorithm and extract the tables, then he is able to rebuild code equivalent to the original code (being able to encrypt) by extracting all the tables. The present method is intended to avoid this.

DETAILED DESCRIPTION

Figure 1:
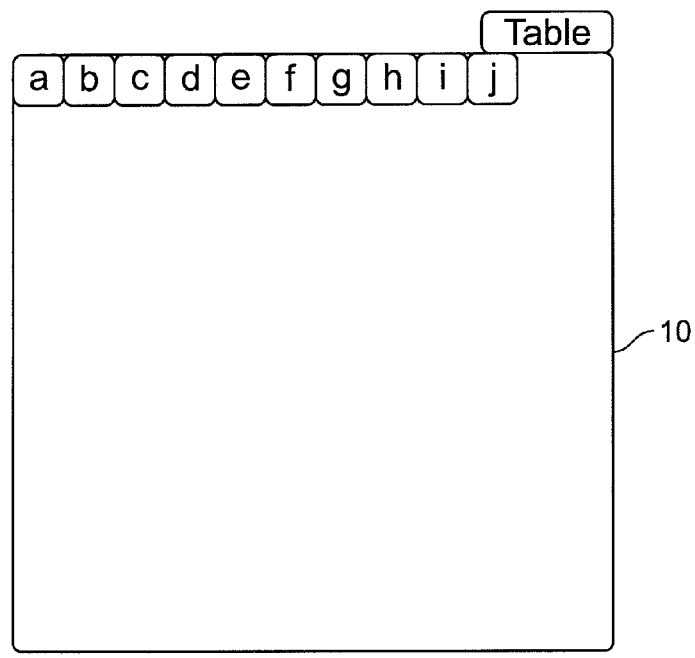
FIG. 1 shows a lookup table.
Figure 2:
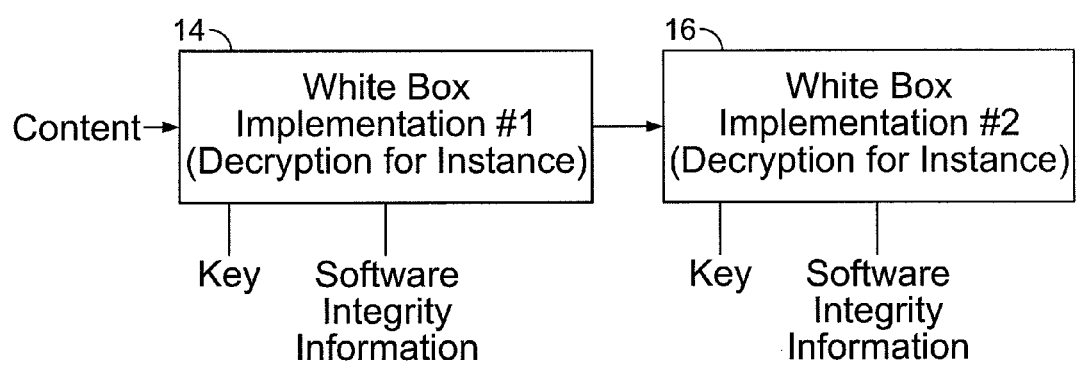
FIG. 2 shows linking together two White Box decryption processes in accordance with the inventions.

To thwart reverse engineering of a part of the computer code implementing a cryptographic algorithm (process) and to reinforce the code protection, the present method protects the tables, which are intensively used for the table lookup operations. Many known White Box cryptographic implementations are tied to the code directly (so that an update of the software could change the underlying implementation as far as it does not modify the final result). The present disclosure is of a way to tie two or more White Box implementations together, see FIG. 2 showing such a dynamic White Box process. In FIG. 2 there two White Box processes 14, 16 respectively are sequentially linked. Each accepts a data input ("content" for process 14), a key, and the requisite integrity (verification) information, where the data output of process 14 is the data input to process 16.

In this approach, the input content and cryptographic keys remain unchanged but the values in the lookup tables are changed at the time of compilation of the source code. Software integrity information provided in the code allows the method to tie the implementation to the software (code) itself. This way, part of the process cannot be attacked directly without having to reverse engineer this additional protection. Any modification by an attacker to the integrity of software (by adding a patch, software breakpoint, etc.) will inevitably tamper with the associated integrity verification information and lead to changes in the resulting output, making it easy to detect such code tampering. See commonly owned United States Patent Application Publication No. 20080168564, Software or other information integrity verification using variable block length and selection, incorporated herein by reference in its entirety.

Figure 3:
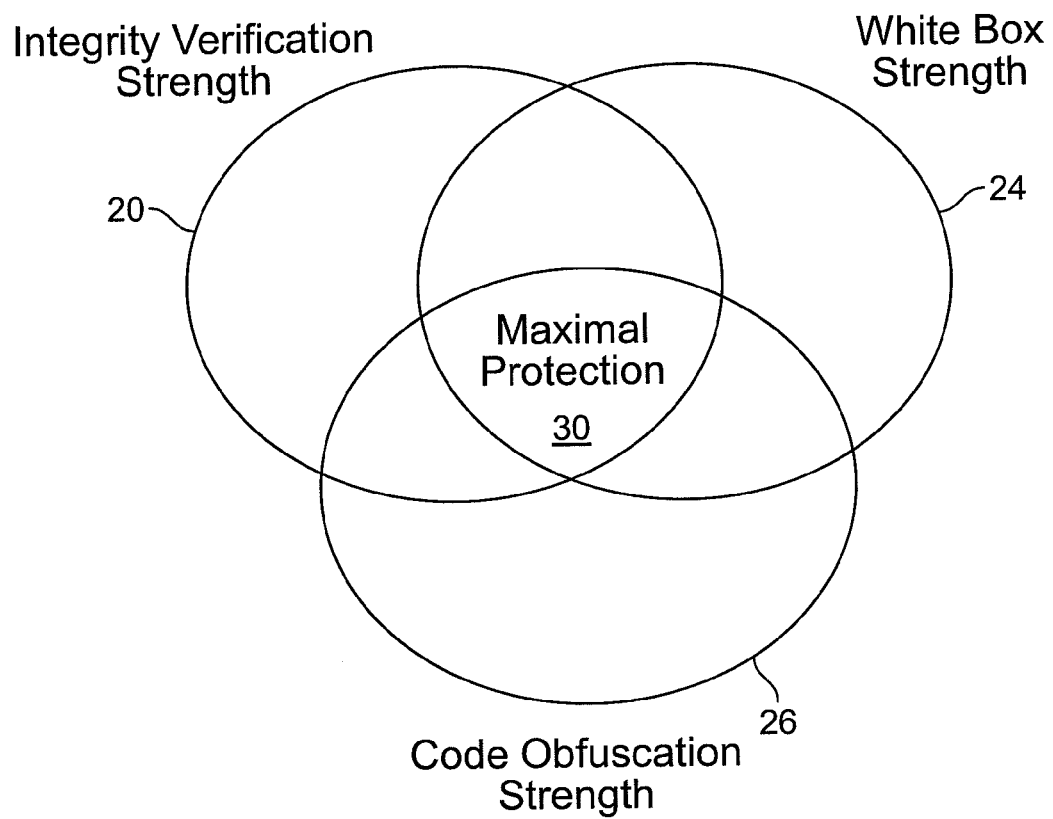
FIG. 3 shows three overlapping code protection techniques.

FIG. 3. shows graphically three well known methods of protecting computer code—integrity verification 20 as described above, a White Box implementation 24, and code obfuscation 26, each having particular strengths. Given these three different ways to ensure strength against reverse engineering attacks, the maximal level of security is reached at the intersection 30 of the three different protections. The attacker would have to fully break all three protections, which is much more complicated and time consuming to achieve than breaking each independently.

Figure 4:
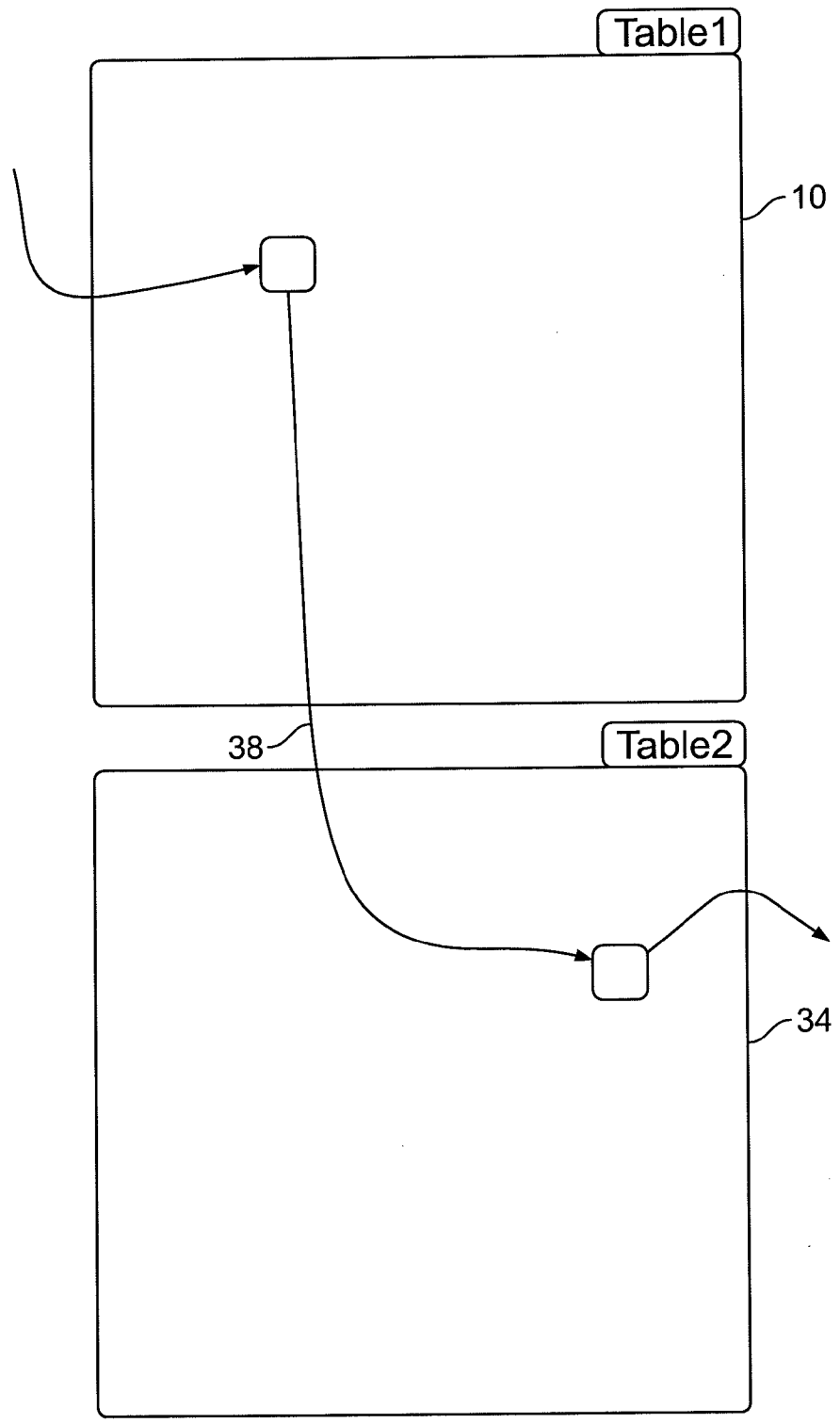
FIG. 4 shows as in FIG. 2 linking together two tables.

A table is globally (all entries) masked in accordance with the invention, where this may be accomplished by any type of masking operation (generically referred to as a "permutation"). This masking is performed on the source code when it is compiled. This process is illustrated in FIG. 4. Given a table T 10, there is an input masking function designated FIM(.) and an output masking function designated FOM(.). Table T is transformed into FIM^(-1).T.FOM. The input mask of the next table 34 for the given word is FOM. The term "masking" here refers generally to performing a permutation (an ordered combination) operation where the "mask" defines the permutation. More generally, the permutation means applying any invertible logical or arithmetic operation. This means that the output mask of the first table 10 is actually the input mask of the second table 34, and so on.

As shown in FIG. 4, if the connection 38 between the table S 10 and 34 is reverse engineered, and if the extra other operations are also reverse engineered, then the code can be extracted by an attacker and placed somewhere else. Given the code of the White Box process implementation plus all the code where the White Box data output is used, it is possible to create a set of masks corresponding to all the code. This set of values which are (1) masks for the White Box, and (2) hash values for the integrity verification, is denoted {T_i}_i and referred to by the term "hashes" in the following disclosure without limiting this to using an actual hash function to produce these values. Any integrity verification function such as a cyclic redundancy check (CRC) or a checksum may be used here instead of an actual hash function to calculate these "hash" values. A simple way to construct this set of values {T_i}_i is to compute hashes of various parts of the object (compiled) code which is conventionally expressed in binary form (0's and 1's). Computation of the hashes can be performed with a conventional hash function such as SHA1, SHA2 for instance, or any other hash function or more generally any one-way function. It is well known how to store these hash values and check at a random instant some particular hash value T_j by recomputing it from the compiled code at the runtime of the code to verify the code integrity by means of a match.

The process thus is to generate hashes, corresponding to the binary (object) code itself, and then re-use this hash information to perform additional masking operations on the lookup tables. This way the White Box process tables are dependent on the binary code which uses them and an attacker will not be able to simply extract these tables from the binary code and use them as is. It is also a way to associate together two different protections as described above: code integrity verification and White Box cryptography.

The following describes a more complex method which is an extension of the above. This more complex method is usually performed on the object (compiled) code. Let fT designate the one-way function (there may be one function for each T_j computation) used to compute each T_j, so expressed algebraically:

$$T\_j = fT(\text{part\_of\_code\_j})$$

where "part_of_code_j" designates a part (such as a particular number of words or bytes) of the global code in which a White Box cryptographic process implementation is used.

This process does not necessarily mask (called the "extra mask" hereinafter) all entries of the tables but can apply the extra mask only to a part of some of the tables. All tables are subject to the initial masking operation. When accessing the tables dedicated to the White Box process, a call is done to function fT with the index information. fT is an external and code obfuscated function. In one embodiment, the process adds an extra mask operation to the tables. This extra masking is, e.g., a complex encryption of the dedicated or chosen positions, or a simple XOR (logical exclusive OR) operation. Between these two extreme solutions, various other masking methods exist. This extra masking operation is designated EM(.).

Figure 5:
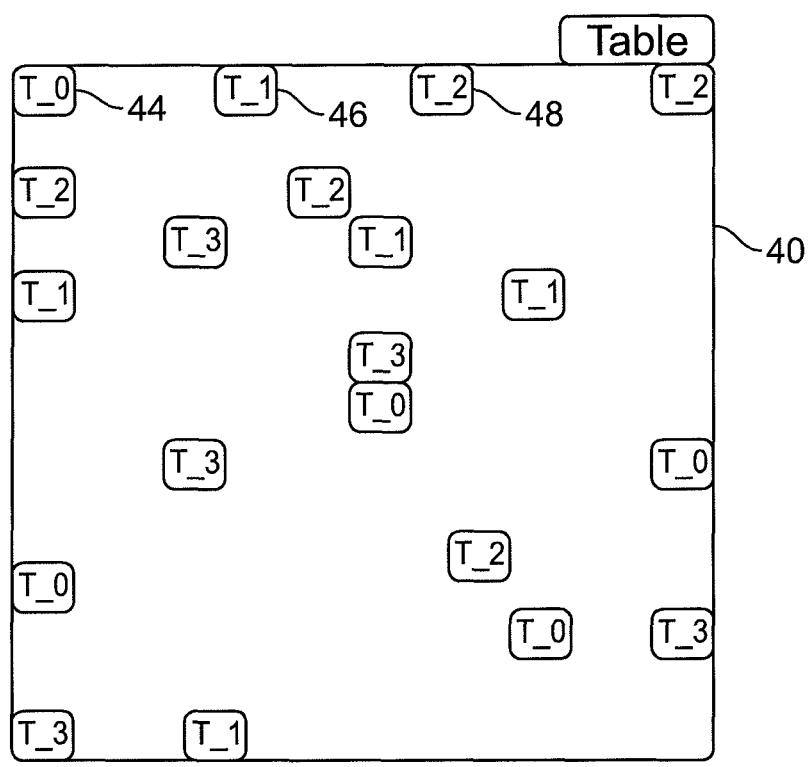
FIG. 5 shows extra masking in accordance with the invention.

Note that only a part of each of the tables may be extra masked. FIG. 5 is an illustration of a table 40 partially masked with four possible values T_j (T_0, T_1, T_2, T_3), but only in certain table positions designated 44, 46, 48, etc.

The extra mask function, designated EM(.), can take different inputs according to what is needed. For instance, the inputs can be only the value in at the original position in the table, denoted A, and T_j. In this example, EM(.) can be merely an XOR operation, so that:

$$T\_j \text{ XOR } A$$

Another example uses a more complicated extra masking function to increase complexity. The extra masking function still must be an invertible operation such as addition, multiplication or a symmetric cipher encryption using a global key k or a table dedicated key with an associated encryption function designated E, so E(A,T_j XOR k). So the initial masking operation is also by definition such an invertible operation. Otherwise one could not unmask it. The input can also use the value of the position A, T_j, the table index position I, and the table number designated tN where there is a number of lookup tables designated by numbers. In this case several complex processes can be used to defeat an attack, for instance expressed logically as:

$$T\_j \text{ XOR } A \text{ XOR } tN \text{ XOR } I$$

with a more complex process with an encryption function E as E(A,f(T_j, tN, I)), where f(.) is any suitable derivation function.

From a security point of view, it is important that the extra masked values cannot be identified to other data (that is, when masked are indistinguishable by an attacker). For instance, the extra masked values should stay in the same range of the usual masked values (byte to byte). Moreover, in a table it is better to mask several positions, because conventionally a given masked value appears only once in each table. It is however possible to circumvent this problem by using a conventional masking process not only depending on a bijection, but also on the position in the table. This way, a given value can appear several times in a table, even prior to applying the extra masking transformation.

The overall implementation of a White Box cryptographic process in accordance with the invention is as follow:
1) Conventionally implement the cryptosystem (or other cryptographic algorithm) in computer source code in a White Box model, conventionally using table lookups.
2) For each table lookup operation, define a unique function for that TLU, only doing the table lookup at this time.
3) Integrate the White Box process implementation in the remaining computer source code for the cryptographic process, which includes computing a hash function of portions of the code and putting the computed hash values in the code, and then at this step conventionally compiling the source code into the corresponding object (binary) code using a compiler.
4) Define the number of hashes T_j needed.
5) Compute a set of hashes T_j of portions of the object code. E.g., the value of j is 0 to 100.
6) Define the table positions on which to apply the extra mask. (This depends on the complexity and on the performance required.) The table positions are stored in a correspondence file, or are defined by symbols (code annotation).
7) For each defined position in the tables for (6), apply the extra mask by applying the inverse of function EM(.), designated EM^(−1), to the defined entries. Update the tables.
8) Update the part of the object code used to access the tables accordingly.

The access to the tables originally (without applying the present protection) was:
1) alpha=Table[beta];
This is replaced in accordance with the invention by:
1) If beta position extra mask
   1) Call external to obtain T_j (used in EM)
   2) Compute alpha=EM(Table[beta])
2) else alpha=Table[beta], where conventionally alpha designates the TLU output and beta designates the TLU input.

The previous example considers only extra masking of selected table positions. This extra masking could also be applied to all table positions.

The information about which part of each table is transformed can be determined either dynamically (computed only at run time), or stored statically at compilation time in another (master) table lookup. Run time means code execution, when the cryptographic process object code is executed on a message being encrypted. Static or dynamic processes may be used in various table lookups in one cryptographic process. For the static case, the master table contains a list of the other table lookups and their indices which are transformed and the tables which are not transformed. For the dynamic case, the goal is to know, from various information, if the table index which has to be fetched is transformed or not. One way to do this is to use a multi-root polynomial. For instance, if there are 50 table indexes, and 20 of them are transformed indexes, one could use a polynomial of degree 20. Each index which requires a transformation would be a root of the polynomial (for performance reasons, operations would be done modulo a given value). Typically an index of 20 is too large to process a byte of data, so this would process a data word or 4 bits. This way, when a value has to be fetched from the table, one would compute this polynomial. If the resulting value is null, then one would need to call a transformation to obtain the real value. If not, one could fetch the direct value. This occurs at run time.

The implementation of a White Box cryptosystem requires several table lookups which are accessed several times, so all the tables can be masked with the present process. In another embodiment only some of the tables are masked with the process. In yet other embodiments only a part of each of the tables is masked with the process, or only a part of some of the tables is masked with the process.

The more hash values of T_j available, the more secure is the solution. Masking only some bytes of data at a given table position would result in using only a part of them for one execution. This would also desirably link the code execution process with the data input, since according to the word accessed inside a table a call to obtain T_j is done or not and index j is varying. For instance, if an attacker wants to lift all the White Box process tables, he will have to monitor several different decryptions to know which parts of the tables are transformed, and how they are transformed.

Since the present method uses information regarding the binary (compiled or object) code itself for verification purposes, it by definition cannot have that information in the corresponding source code before it is compiled. So in one embodiment the method uses multiple passes to develop the binary code from the source code, as follows:

1. Some room in the binary code is pre-allocated by the developer to store the White Box lookup tables. This can be done by providing a buffer with a known pattern in the source code (so the developer will be able to locate this buffer in the resulting binary code).
2. Room for a master table lookup containing information about which range of the tables are transformed is pre-allocated by the developer (but not if using the dynamic example presented above).
3. The binary code is conventionally compiled from the source code.
4. Then, the developer needs to hash or checksum selected parts of the binary code and then to integrate into the binary code the resulting software integrity information (the hash values).
5. The developer chooses which parts of which table lookups are to be transformed (masked) and embeds them into the binary code in the pre-allocated table space per step 1 (but not if using the dynamic example presented above).
6. The White box tables are modified according to the two previous integrated tables which are (1) the White Box tables modified with the hash values and (2) the master table, and are also themselves integrated into the binary code.

These steps are typically performed using suitable software tools provided to the developer along with the conventional compiler. Each computer language of course has such a compiler.

The overall object code creation process can be summarized as:

1. Generate software integrity verification information and embed it into the object code.
2. Generate the White Box tables according to the cryptographic implementation and previous software integrity verification information computed for the text sections of the code (the instructions vs. the table contents) or any other section of the code, except for the allocated space containing the White Box tables.

The White Box table lookups are modified at source code compilation time accordingly to store the software integrity verification information, and the "correction" (recovering actual cryptographic values) is performed at run time, according to the instant recomputed software integrity verification information.

For the case of a plurality of linked White Box processes (see FIG. 2), the modification of the cryptographic information can be split among different table lookups, so the resulting output of the first White Box process will not be valid "as is" but will be corrected by the subsequent White Box process (which takes the first White Box process output as its own input).

In case of software integrity tampering or modification by an attacker, the White Box software integrity information will be corrupted since the integrity verification (hash) computation will generate an unexpected result and table lookups will not be computed with the correct values. As a consequence, the deciphered integrity verification (hash) value will not be retrieved correctly.

Advantages of the present method include: the complexity of the cryptography process is increased, tying the cryptographic implementation and results to the software which hosts the code protects integrity, and tables cannot be simply lifted from the object code by an attacker as they were before so they are protected. White Box security is also dependent on the software integrity protection. Here the tables are never all "in clear" in memory and so are harder to reverse engineer.

When this masked object code is executed on the user's system, for instance to actually encrypt or decrypt a message, the object code is unmasked at run time.

Figure 6:
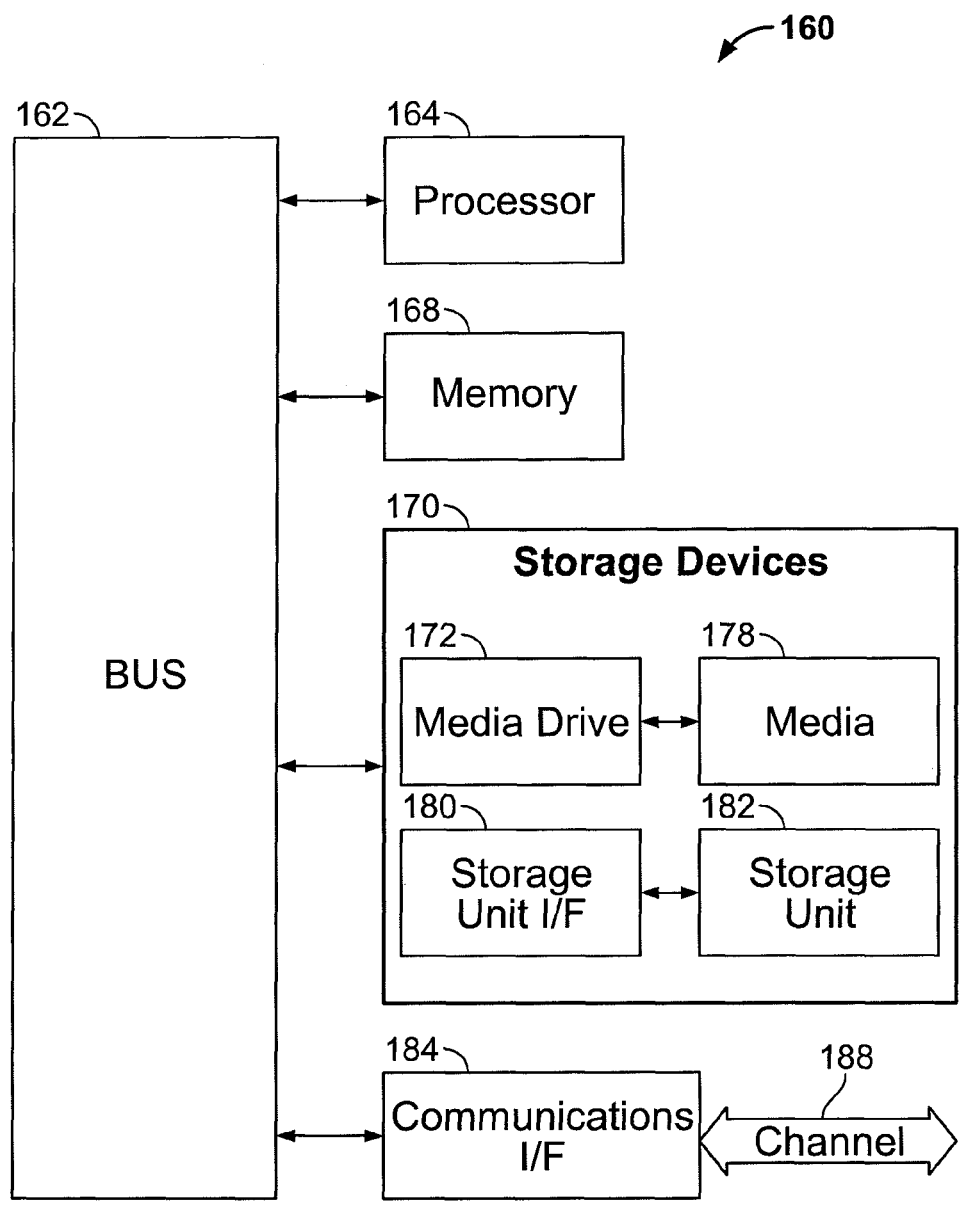
FIG. 6 shows a computing system of the type used in accordance with the invention.

FIG. 6 shows in a block diagram relevant portions of a computing device (system) in accordance with the invention for carrying out the above masking and hashing processes. This is, e.g., a computer, server, or part of such a device and includes conventional hardware components executing in one embodiment software (computer code) embodying the above examples of a cryptographic (e.g., encryption or decryption) code protection process. This code may be, e.g., in the C or C++ computer language or its functionality may be expressed in the form of firmware or hardware (circuitry) logic; writing such code or designing such logic would be routine in light of the above disclosure.

Computer code in terms of the above described developer's tools and the compiler is conventionally stored in memory (computer readable storage medium, e.g., RAM or ROM) associated with a processor for in the computing system execution by the processor. The incoming source code embodying the cryptographic process to be protected is received at a port of the computing system and stored in a computer readable storage medium (memory, e.g., RAM) where it is coupled to the processor. The processor conventionally partitions the code into suitable sized blocks at the partitioning module. Other software (code) modules executed by the processor carry out the functionality set forth above.

FIG. 6 thus illustrates a typical and conventional computing system 160 that may be employed to implement processing functionality in embodiments of the invention for (1) protecting the code or (2) executing the protected code. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor. Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168, such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184. Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of protecting a cryptographic process including a plurality of lookups on a plurality of tables, the method comprising:
   compiling source code for performing the cryptographic process into object code;
   applying a one-way function to portions of the object code to generate a set of mask values;
   applying the set of mask values to entries of the tables in order to mask the entries stored in the tables; and
   embedding the tables in the object code for use during later execution of the object code.

2. The method of claim 1, wherein the cryptographic process is adapted for an insecure environment.

3. The method of claim 1, wherein the cryptographic process comprises one of enciphering and deciphering using a block cipher.

4. The method of claim 1, wherein the one-way function is one of a hash function, checksum, and cyclic redundancy check.

5. The method of claim 1, wherein the mask values are applied to all entries of at least one of the tables.

6. The method of claim 1, wherein the mask values are applied only to some entries of at least one of the tables.

7. The method of claim 1, wherein applying the one-way function comprises:
   identifying a plurality of one-way functions; and
   applying a different one of the one-way functions to different entries of the tables.

8. The method of claim 1 further comprising storing information indicating which entries of each table are masked with the mask values, wherein the stored information is for use to unmask the masked entries during the execution of the compiled object code.

9. The method of claim 8, wherein the stored information is for use in determining which entries of each table are masked based on calculated roots of a polynomial.

10. The method of claim 1, wherein applying the mask values comprises using an invertible logical or mathematical operation.

11. The method of claim 1, wherein applying the mask values comprises using the mask value as a key for encryption or applying the mask value to a table entry using a logical operation.

12. An apparatus adapted to protecting a cryptographic process including a plurality of lookups on a plurality of tables, the apparatus comprising:
   a set of processing units; and
   a machine readable medium storing a program which when executed by at least one of the set of processing units masks entries of the tables, the program comprising sets of instructions for:
      compiling source code for performing the cryptographic process into object code;
      applying a one-way function to portions of the object code to generate a set of mask values;
      applying the set of mask values to entries of the tables in order to mask the entries stored in the tables; and
      embedding the tables in the object code for use during later execution of the object code.

13. The apparatus of claim 12, wherein the cryptographic process is adapted for an insecure environment.

14. The apparatus of claim 12, wherein the cryptographic process comprises one of enciphering and deciphering using a block cipher.

15. The apparatus of claim 12, wherein the one-way function is one of a hash function, a checksum, and a cyclic redundancy check.

16. The apparatus of claim 12, wherein the mask values are applied to all entries of at least one of the tables.

17. The apparatus of claim 12, wherein the mask values are applied only to some entries of at least one of the tables.

18. The apparatus of claim 12, wherein the set of instructions for applying the one-way function comprises sets of instructions for:
   identifying a plurality of one-way functions; and
   applying a different one of the one-way functions to different entries of the tables.

19. The apparatus of claim 12, wherein the program further comprises a set of instructions for storing information indicating which entries of each table are masked with the mask values, wherein the stored information is for use to unmask the masked entries during the execution of the compiled object code.

20. The apparatus of claim 19, wherein the stored information is for use in determining which entries of each table are masked based on a master table comprising indexes for entries that are masked.

21. The apparatus of claim 12, wherein the set of instructions for applying the mask values comprises a set of instructions for using an invertible logic or mathematical operation.

22. The apparatus of claim 12, wherein the set of instructions for applying the mask values comprises a set of instructions for using a mask value as a key for encryption or applying the mask value to a table entry using a logical operation.

23. A non-transitory machine readable medium for storing a program which when executed by a set of processing units performs a protected cryptographic process comprising a table lookup based on a data portion, the program comprising sets of instructions for:
   identifying a particular location in a table that corresponds to the data portion;
   determining whether a first value at the particular location in the table has been masked;
   when the first value has been masked:
      using a one-way function to compute a second value based on a portion of object code of the program; and
      generating an output value for the table lookup based on the first and second values; and
   when the first value has not been masked, setting the first value as the output value for the table lookup.

24. The non-transitory machine readable medium of claim 23, wherein the set of instructions for determining whether a first value has been masked comprises a set of instructions for identifying a corresponding record for the particular location using a table lookup on a master table.

25. The non-transitory machine readable medium of claim 23, wherein the set of instructions for determining whether the first value has been masked comprises sets of instructions for:
   identifying an index for the particular location of the first value; and
   determining whether the first value is masked based on whether the index corresponds to roots of a polynomial.

26. The non-transitory machine readable medium of claim 23, wherein the set of instructions for generating the output value comprises a set of instructions for using the second value as a key for decrypting the first value.

27. The non-transitory machine readable medium of claim 23, wherein the set of instructions for generating the output value comprises a set of instructions for applying the second value to the first value using a logical operation.

28. The non-transitory machine readable medium of claim 23, wherein the one-way function is one of a hash function, a checksum, and a cyclic redundancy check.

29. The non-transitory machine readable medium of claim 23, wherein the cryptographic process comprises one of enciphering and deciphering using a block cipher.

30. The non-transitory machine readable medium of claim 23, wherein the set of instructions for using a one-way function comprises sets of instructions for identifying a particular one-way function from a plurality of one-way functions.

31. The non-transitory machine readable medium of claim 23, wherein generating the output value is further based on an index position of the particular location in the table.

* * * * *